(12) United States Patent
Kojima

(10) Patent No.: US 7,048,632 B2
(45) Date of Patent: *May 23, 2006

(54) IMAGE PROCESSING METHOD, VIDEO GAME APPARATUS AND STORAGE MEDIUM

(75) Inventor: Hideo Kojima, Tokyo (JP)

(73) Assignee: Konami Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,467

(22) Filed: Mar. 19, 1999

(65) Prior Publication Data

US 2002/0082080 A1 Jun. 27, 2002

(30) Foreign Application Priority Data

Mar. 19, 1998 (JP) .................................. 10-070991

(51) Int. Cl.
*A63F 13/00* (2006.01)

(52) U.S. Cl. ...................................... 463/32; 345/419

(58) Field of Classification Search .................... 463/2, 463/7, 8, 30–35, 43, 44; 345/419, 474, 121, 345/123, 125, 139, 157, 501, 502, 505, 520, 345/521, 522, 526, 1, 949, 960

See application file for complete search history.

(56) References Cited

U.S. PATENT DOCUMENTS 5,184,956 A * 2/1993 Langlais et al. ............... 434/69
5,261,820 A * 11/1993 Slye et al. ................... 273/237
5,269,687 A * 12/1993 Mott et al. ................... 273/454
5,299,810 A * 4/1994 Pierce et al. .................... 463/2
5,616,031 A * 4/1997 Logg ............................ 434/38
5,616,079 A * 4/1997 Iwase et al. ................. 345/428
5,649,862 A * 7/1997 Sakaguchi et al. ............ 463/44
5,768,393 A * 6/1998 Mukojima et al. ............ 381/17
5,769,718 A * 6/1998 Rieder .......................... 463/30
5,830,066 A * 11/1998 Goden et al. ................. 463/33
5,971,852 A * 10/1999 Itai et al. ...................... 463/31
6,093,105 A * 7/2000 Morihira ....................... 463/38

(Continued)

FOREIGN PATENT DOCUMENTS

CN          270895          2/1996

(Continued)

OTHER PUBLICATIONS

Merriam Webster's Collegiate Dictionary, Tenth Edition, pp. 1129 and 1257.*

(Continued)

Primary Examiner—Scott Jones
(74) Attorney, Agent, or Firm—Lerner, David, Littenberg, Krumholz & Mentlik, LLP

(57) ABSTRACT

A video game apparatus produces a image of a player character whose motion is operated by a player and a scene image which changes according to the motion of the player character, and displays the produced player character image and scene image on a display unit. The video game apparatus further produces sound effects according to the motion of the player character. The video game apparatus produces a first scene image subjectively viewed by the player character when the player character is stopped in a movable state, and a second scene image objectively viewing the motion of the player character when the player character is moved, and displays the produced one of the first and second scene images on the display unit. The video game apparatus produces different sound effects depending on which of the first and second scene images is displayed.

11 Claims, 8 Drawing Sheets

U.S. PATENT DOCUMENTS

| | | | |
|---|---|---|---|
| 6,117,007 A * | 9/2000 | Matsuyama et al. | 434/62 |
| 6,175,366 B1 * | 1/2001 | Watanabe et al. | 345/422 |
| 6,183,363 B1 * | 2/2001 | Ishihara et al. | 463/1 |
| 6,231,443 B1 * | 5/2001 | Asai et al. | 463/32 |
| 6,283,857 B1 * | 9/2001 | Miyamoto et al. | 463/31 |

FOREIGN PATENT DOCUMENTS

| | | |
|---|---|---|
| CN | 327686 | 3/1998 |
| EP | 008092 | 2/1980 |
| EP | 0 695 569 | 2/1996 |
| EP | 0 725 354 A1 | 8/1996 |
| EP | 0801 363 A1 | 10/1997 |
| EP | 0 813 351 A2 | 12/1997 |
| EP | 0830 879 A2 | 3/1998 |
| EP | 0 841 640 A1 | 5/1998 |
| EP | 0841 640 A1 | 5/1998 |
| JP | H04-322315 | 11/1992 |
| JP | 07072875 | 3/1995 |
| JP | H07-116343 | 5/1995 |
| JP | 07-155462 * | 6/1995 |
| JP | H07-155462 | 6/1995 |
| JP | H07-178242 | 7/1995 |
| JP | 08126767 | 5/1996 |
| JP | CN 1174749 A | 3/1998 |
| JP | H10-137445 | 5/1998 |
| KR | 98-702015 | 7/1998 |
| WO | WO97/36261 | 10/1997 |

OTHER PUBLICATIONS

Corpse Killer Instruction Booklet, 1994, USPTO Library, pp. 1-15.*

Korean Office Action Dec. 8, 2005.

English Translation of Korean Office Action.

* cited by examiner

IMAGE PROCESSING METHOD, VIDEO GAME APPARATUS AND STORAGE MEDIUM

BACKGROUND OF THE INVENTION

1. Field of the Invention

The present invention relates to an image processing technique which is applicable to a video game apparatus for enhancing attractiveness of a game.

2. Description of the Related Art

In recent years, role-playing game apparatuses or softwares have been actively developed, wherein, for example, a player operates motion of a player character appearing in a game so that the player character fights a counterpart character. In recent video game apparatuses, attractiveness is enhanced by, not only operating motion of a player character, but also making a game itself storyful as well as using a three-dimensional Computer Graphic (CG) image processing technique to express motion of a player character and a counterpart character and change of scene images in a more realistic fashion. According to the conventional video game apparatuses, the motion of the characters and the scene images are displayed on an external display unit, a television or the like while being expressed in bird's eye or air views at predetermined viewpoint positions and in predetermined visual fields. Further, sound effects produced during operation of the player character are such that predetermined tones are outputted at predetermined scenes.

In the player-joining-type video game apparatuses typified by the role-playing game apparatuses, scene images are normally produced according to operation of the player character by the player wherein the player can feel as if the player acted and fought the counterpart character on a video display screen. In such video game apparatuses, when playing, for example, a storyful video game with tense scenes, it is effective to allow the player to experience a feeling of tension for enhancing attraction for the game.

However, as described above, in the conventional video game apparatuses, the motion of the characters and the scene images are reproduced at the predetermined viewpoint positions and the predetermined sound effect is produced per scene. Thus, it is difficult to render the player effectively experience the state of tension.

SUMMARY OF THE INVENTION

Therefore, it is an object of the present invention to provide an image processing method which can diversify expressing manners of characters and scene images.

It is another object of the present invention to provide a video game apparatus which can enhance attraction for a game using the foregoing diversified expressing manners.

It is another object of the present invention to provide a storage medium for realizing the foregoing image processing method or the foregoing video game apparatus using a computer.

According to one aspect of the present invention, there is provided an image processing method executed by a computer, comprising the steps of detecting a display position and motion of a character on a display unit; selectively producing one of a first scene image and a second scene image based on the detected display position and motion of the character, the first scene image subjectively viewed by the character, and the second scene image objectively viewing the motion of the character; and displaying the produced one of the first and second scene images on the display unit.

It may be arranged that a movement command is accepted when producing the second scene image so that a moving image of the character is produced based on the accepted movement command, while the movement command is unacceptable when producing the first scene image.

It may be arranged that when it is detected that the character is located at a wall a region behind which can not be seen, a scene image objectively viewing the character and the region is produced.

It may be arranged that a command for movement of the character along the wall is accepted, and a moving image of the character is produced based on the accepted movement command.

It may be arranged that when the character is hidden by a given thing in the second scene image, the first scene image is produced regardless of movement of the character.

It may be arranged that a radar image is produced and displayed on the display unit, the radar image showing a relative position and a visual field of the character and a relative position and a visual field of a counterpart character which is possible to fight the character.

It may be arranged that when the character gets in the visual field of the counterpart character, the radar image is changed in color.

It may be arranged that in a scene where the character can selectively use one of a set of items, the items are displayed so as to be scrolled in sequence.

According to another aspect of the present invention, there is provided a video game apparatus which displays on a display unit a character operated by a player and a scene image around the character, the apparatus comprising a scene image producing section which selectively produces one of a first scene image, a second scene image and a third scene image, and displays the produced one of the first, second and third scene images on the display unit, the first scene image subjectively viewed by the character while stopped in a movable state, the second scene image subjectively viewed by the character while moving, and the third scene image objectively viewing the character and motion of the character.

It may be arranged that the video game apparatus further comprises a sound effect producing section which produces different sound effects depending on which of the first, second and third scene images is displayed.

It may be arranged that the video game apparatus further comprises a command accepting section which accepts a movement command from the player when one of the second and third scene images is displayed so that a moving image of the character is produced based on the accepted movement command, while refuses the movement command when the first scene image is displayed.

It may be arranged that the scene image producing section, upon detection that the character is located at a wall a region behind which can not be seen, produces a fourth scene image objectively viewing the character and the region.

It may be arranged that the video game apparatus further comprises a command accepting section which accepts a command for movement of the character along the wall and produces a moving image of the character based on the accepted movement command.

It may be arranged that the video game apparatus further comprises a sound effect producing section which produces different sound effects depending on which of the first, second, third and fourth scene images is displayed.

It may be arranged that when the character is hidden by a given thing in the third scene image, the scene image producing section produces the second scene image.

It may be arranged that the scene image producing section produces a radar image and displays the radar image on the display unit, the radar image showing a relative position and a visual field of the character and a relative position and a visual field of a counterpart character which is possible to fight the character.

It may be arranged that when the character gets in the visual field of the counterpart character, the scene image producing section changes a color of the radar image.

It may be arranged that the video game apparatus further comprises an item displaying section which, in a scene where the character can selectively use one of items, displays the items so as to be scrolled in sequence for allowing the player to select one of the items.

It may be arranged that the scene image producing section comprises an exchangeable memory and a reading section for the memory, and that the memory stores image element data necessary for producing the character and the first, second and third scene images.

It may be arranged that the image element data is element data for producing a three-dimensional CG image.

According to another aspect of the present invention, there is provided a video game apparatus comprising a controller for operating motion of a character; a scene image producing section which produces the character whose motion is operated by the controller and a scene image which changes according to a position and the motion of the character, and displays the character and the scene image on a display unit; and a sound effect producing section which produces a sound effect corresponding to the position and motion of the character, wherein the scene image producing section produces a first scene image when the character is stopped in a movable state and a second scene image when the character is moved, the first scene image subjectively viewed by the character and the second scene image objectively viewing the motion of the character, the scene image producing section displaying the produced one of the first and second scene images on the display unit, and wherein the sound effect producing section produces different sound effects depending on which of the first and second scene images is displayed.

It may be arranged that the video game apparatus further comprises a command accepting section which accepts a movement command when the second scene image is displayed so that a moving image of the character is produced based on the accepted movement command, while refuses the movement command when the first scene image is displayed.

It may be arranged that the scene image producing section, upon detection that the character is located at a wall a region behind which can not be seen, produces a scene image objectively viewing the character and the region.

It may be arranged that the video game apparatus further comprises a command accepting section which accepts a command for movement of the character along the wall and produces a moving image of the character based on the accepted movement command.

It may be arranged that when the character is hidden by a given thing in the second scene image, the scene image producing section produces the first scene image regardless of movement of the character.

It may be arranged that the scene image producing section produces a radar image and displays the radar image on the display unit, the radar image showing a relative position and a visual field of the character and a relative position and a visual field of a counterpart character which is possible to fight the character.

It may be arranged that when the character gets in the visual field of the counterpart character, the scene image producing section changes a color of the radar image.

It may be arranged that the sound effect producing section produces a different sound effect when the scene image producing section changes the color of the radar image.

It may be arranged that the video game apparatus further comprises an item displaying section which, in a scene where the character can selectively use one of items, displays the items so as to be scrolled in sequence for allowing selection of one of the items.

It may be arranged that the scene image producing section comprises an exchangeable memory and a reading section for the memory, and that the memory stores image element data necessary for producing the character and the first and second scene images.

It may be arranged that the image element data is element data for producing a three-dimensional CG image.

According to another aspect of the present invention, there is provided a computer-readable recording medium storing a program which causes a computer to execute a process of detecting motion of a character to be displayed; a subjective mode process of producing a first scene image subjectively viewed by the character while stopped in a movable state; an intrude mode process of producing a second scene image subjectively viewed by the character while moving; a bird's eye view mode process of producing a third scene image objectively viewing the character and the motion of the character; and a process of switching among the subjective mode process, the intrude mode process and the bird's eye view mode process according to the motion of the character so as to display corresponding one of the first, second and third scene images on a display unit.

It may be arranged that the program causes the computer to produce different sound effects depending on which of the first, second and third scene images is produced.

It may be arranged that the subjective mode process and the bird's eye view mode process are switched therebetween based on an external command.

It may be arranged that when the character is hidden by a given thing in the bird's eye view mode process, the bird's eye view mode process is automatically switched to the intrude mode process.

It may be arranged that the program causes the computer to execute a process of accepting a command for movement of the character in each of the intrude mode process and the bird's eye view mode process so as to move the character, while refusing the movement command in the subjective mode process.

It may be arranged that the program causes the computer to further execute a behind mode process which, upon detection that the character is located at a wall a region behind which can not be seen, produces a scene image objectively viewing the character and the region.

It may be arranged that the program causes the computer to execute a process of accepting a command for movement of the character along the wall so as to move the character.

It may be arranged that the program causes the computer to execute a process of producing a radar image and displaying the radar image on the display unit, the radar image showing a relative position and a visual field of the character and a relative position and a visual field of a counterpart character which is possible to fight the character.

It may be arranged that the program causes the computer to execute a process of changing a color of the radar image when the character gets in the visual field of the counterpart character.

It may be arranged that the program causes the computer to produce a different sound effect when the color of the radar image is changed.

It may be arranged that the program causes the computer to execute a process of displaying a plurality of items so as to be scrolled in sequence on the display unit, the items selected and used by the character.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a video game apparatus according to a preferred embodiment of the present invention will be described hereinbelow with reference to the accompanying drawings.

In this embodiment, the video game apparatus is a three-dimensional CG game apparatus, wherein there appear a player character invading the enemy's territory to achieve a given purpose, various facilities and installations arranged in the enemy's territory and a plurality of counterpart characters who fight the player character with empty hands or with weapons when the player is found in the facilities.

The video game apparatus is realized when a program (program codes) stored in a CD-ROM as one example of a storage medium is read into a basic apparatus being a computer. Specifically, the program is stored in the CD-ROM in a computer-readable fashion for allowing the basic apparatus to execute later-described various processes. Hereinafter, this program will be referred to as "game program". In the following description, it is assumed that the game program also includes data and control parameters necessary for execution thereof.

Now, the basic apparatus will be first described hereinbelow.

The basic apparatus reads out the game program and three-dimensional image element data from the foregoing CD-ROM which is exchangeable and portable, and carries out execution thereof so as to produce three-dimensional CG images representing various characters and scene images, display them on a display unit 25 and control the displaying. As the basic apparatus, one described in, for example, U.S. Pat. No. 5,757,376 can be used.

Figure 1:
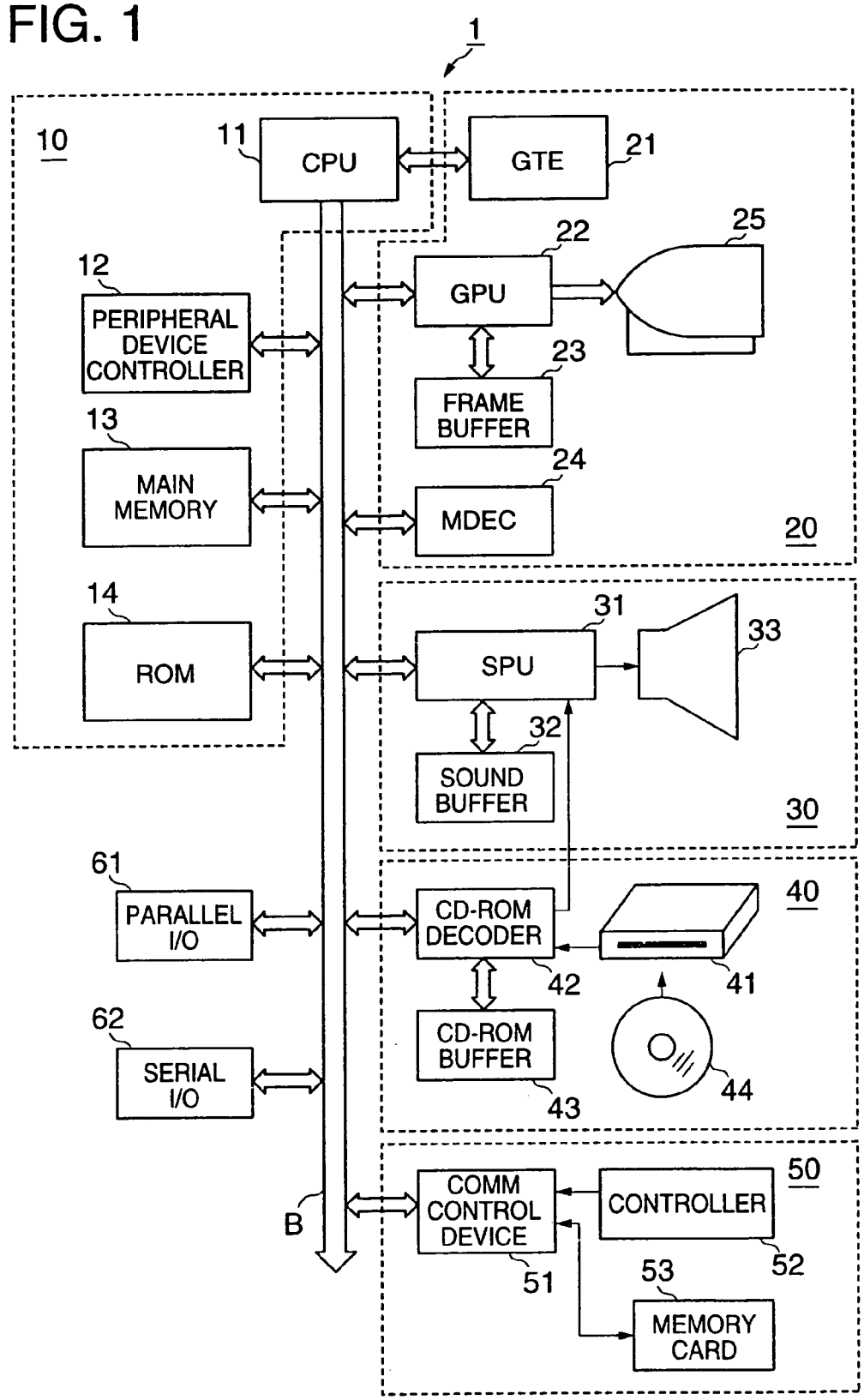
FIG. 1 is a block diagram showing a hardware structure of a basic apparatus to which the present invention is applied.

As shown in FIG. 1, a basic apparatus 1 comprises a main control section 10, an image processing section 20, a sound control section 30, a disk control section 40, a communication control section 50 and a main bus B connecting the foregoing functional blocks 10 to 50 to allow two-way communications among them.

The main control section 10 comprises a CPU 11, a peripheral device controller 12 for carrying out an interrupt control, a direct memory access (DMA) transfer control, etc., a main memory 13 for temporarily storing the game program, the image element data, etc., and a ROM 14 storing an operating system (OS) etc. for managing the image processing section 20, the sound control section 30, etc. The CPU 11 is a RISC (reduced instruction set computer) CPU, executing the OS stored in the ROM 14 to control the basic operation of the whole apparatus and further executing the game program stored in the main memory 13 to realize a plurality of functional blocks which will be described later.

The image processing section 20 comprises a geometry transfer engine (GTE) 21 carrying out high-speed coordinate transformation relative to the image element data etc. stored in the main memory 13 and so forth, a graphics processing unit (GPU) 22 for drawing three-dimensional CG images composed of combinations of polygons, such as triangles and quadrilaterals, and sprites according to drawing commands from the CPU 11, a frame buffer 23 for temporarily storing the three-dimensional CG images drawn by the GPU 22, and an image decoder (MDEC) 24 for decoding compressed image data as requested. The display unit 25 is connected to the basic apparatus 1 directly or via an external interface for reading out the three-dimensional CG images stored in the frame buffer 23 to display them.

By consecutively executing the drawing by the GPU 22 and the storing into the frame buffer 23, the three-dimensional CG images including motion image elements can be displayed on the display unit 25.

The sound control section 30 comprises a sound processing unit (SPU) 31 for producing sound effects etc. according to data about acoustics, a sound buffer 32 for temporarily storing tone generator data for the sound effects, and a loudspeaker 33 for outputting the sound effects etc. produced at the SPU 31. The SPU 31 has an ADPCM decoding function of, for example, reproducing tone generator data subjected to adaptive differential pulse code modulation (ADPCM), a function of producing sound effects etc. by reproducing tone generator data stored in the sound buffer 32, a modulating function of modulating and reproducing tone generator data stored in the sound buffer 32, and so forth. Given such functions, the SPU 31 can be used as a sampling tone generator for producing sound effects, background tones, background music (BGM), etc. based on tone generator data stored in the sound buffer 32.

The disk control section 40 comprises a disk drive 41 for reproducing the game program and the other data stored in a CD-ROM 44, a CD-ROM decoder 42 for decoding the reproduced data when error correcting codes (ECC) are added thereto, and a CD-ROM buffer 43 for temporarily storing the reproduced data from the disk drive 41 before storing them into the main memory 13. The CD-ROM decoder 42 constitutes a part of the sound control section 30. An audio output from the CD-ROM decoder 42 is once inputted into the SPU 31 where it is mixed with an SPU output, and then inputted into a reverb unit so as to be a final audio output.

The communication control section 50 comprises a communication control device 51 for controlling communication with the CPU 11 via the main bus B, a controller 52 and a memory card 53 for storing the setting of a game etc.

The controller 52 is an interface for inputting operation contents by the player and includes a start key for commanding the start or restart of a game, a reset key for commanding the reset of the game, a selection key for commanding movement of a character in longitudinal and transverse directions and moving a cursor to desired one of menus or items, a command key for commanding detailed motion of the character and commanding a selected menu, and so forth. The controller 52 transmits the state of each key to the communication control device 51 in synchronous communication. The commands for the longitudinal and transverse movements of the character can be inputted using, for example, a cross-shaped key provided on a handheld box or a joystick.

The communication control device 51 notifies the state of each key of the controller 52 to the CPU 11. In this fashion, the commands from the player are given to the CPU 11 so that the CPU 11 performs an image displaying process and a game developing process based on the executing game program according to the commands from the player.

If the setting of a game progressing according to a game scenario, the final or intermediate result of the game or the like needs to be stored, the CPU 11 sends the necessary data to the communication control device 51 which then stores the data sent from the CPU 11 into the memory card 53. Since the memory card 53 is separated from the main bus B, it can be loaded or unloaded with the power being on.

The basic apparatus 1 further comprises a parallel input/output (I/O) port 61 and a serial input/output (I/O) port 62 connected to the main bus B, respectively. Connection to a peripheral device can be achieved via the parallel I/O port 61, while connection to another video game apparatus can be achieved via the serial I/O port 62.

In the foregoing basic apparatus 1, when the power gets on or a reset process is executed while the CD-ROM 44 is loaded in the disk drive 41, the CPU 11 executes the OS stored in the ROM 14 to first initialize the whole apparatus, then control the disk control section 40 to read out the game program stored in the CD-ROM 44 and transfer it into the main memory 13, and then execute it. In this event, the image element data etc. are also read into the main memory 13 upon occasion. Through the execution of the game program, the CPU 11 realizes the functional blocks as shown in FIG. 2 so that the video game apparatus generally designated by numeral 2 is presented.

Figure 2:
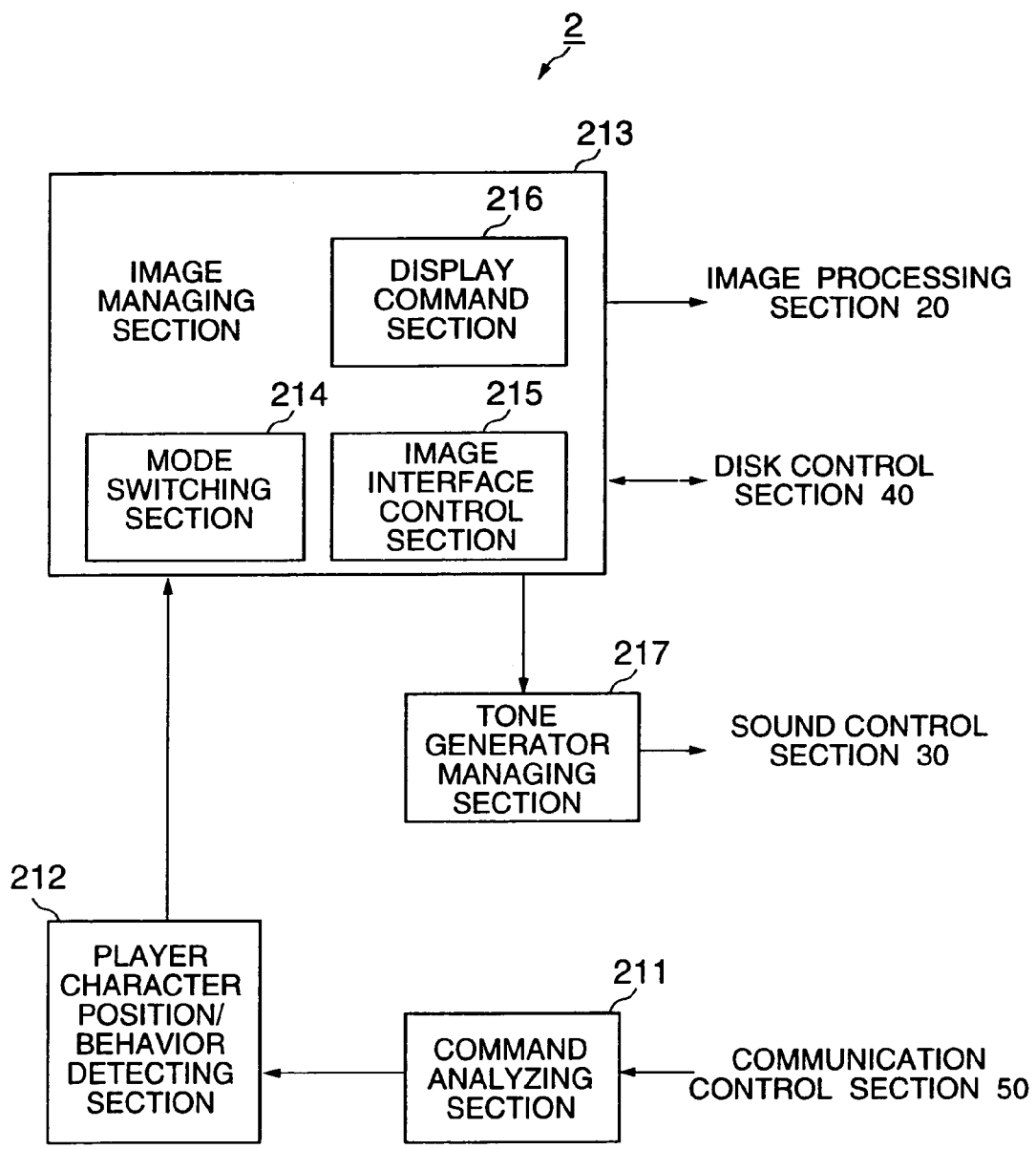
FIG. 2 is a functional block diagram of a video game apparatus according to a preferred embodiment of the present invention.

As shown in FIG. 2, the video game apparatus 2 comprises a command analyzing section 211, a player character position/motion detecting section 212, an image managing section 213 and a tone generator managing section 217.

The command analyzing section 211 analyzes command data inputted from the controller 52 via the communication control device 51 so as to execute required data controls. The command data include, for example, a command for start/stop/restart/end of the game, a command for motion of a character to be operated by the player (hereinafter referred to as "player character"), and a command for item selection which will be described later. When, for example, the game start command is inputted, the command analyzing section 211 loads into the main memory 13 the game program and the data stored in the CD-ROM 44 so as to arrange environments necessary for execution of the game. Further, upon detection of the game stop command, the command analyzing section 211 saves into the memory card 53 data representing the progressing state of the game as described above. On the other hand, upon detection of the command for motion of the player character, the command analyzing section 211 sends the contents of the command to the player character position/motion detecting section 212.

Based on the contents of the foregoing motion command, the player character position/motion detecting section 212 detects a position and motion of the player character actually displayed on the display unit 25. The results of the detection are sent to the image managing section 213.

Depending on the detected position and motion of the player character, the image managing section 213 produces display data of scene images which change on the display unit 25. The image managing section 213 comprises a mode switching section 214, an image interface control section 215 and a display command section 216.

The mode switching section 214, based on the detected position and motion of the player character, selects one of four basic mode processes for an image to be displayed on the display unit 25. The four basic mode processes are (1) a bird's eye view mode process for displaying a scene image in which the player character and the state of motion thereof are objectively watched or viewed in a bird's eye view style, (2) a subjective mode process for displaying an image viewed by the player character's viewpoint, (3) an intrude mode process for displaying a scene image viewed by the player character's viewpoint in the state where the player character is moved, and (4) a behind mode process for displaying a scene image in which the player character and a region behind a wall are viewed in a single display screen. Further, depending on relation to a counterpart character/characters, the mode switching section 214 selects one of (5) a invasion mode process, (6) an alert mode process and (7) an evasion mode process. Furthermore, the mode switching section 214 outputs to the tone generator managing section 217 tone generator command data for controlling the sound control section 30 to produce a sound effect corresponding to each of the mode processes.

The image interface control section 215 produces an interface image to be displayed on the display unit 25 in a superimposed fashion, and performs switching of a display manner of the interface image. The display command section 216 outputs to the image processing section 20 a display command based on produced display data of a scene image.

Figure 3:
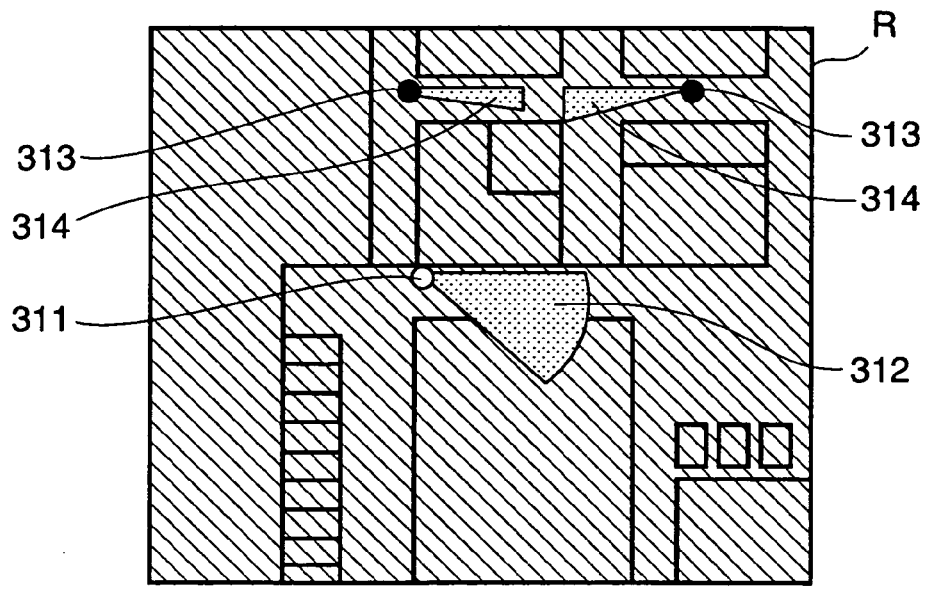
FIG. 3 is an explanatory diagram showing a radar image as an example of an interface image.

FIG. 3 is a radar image R as one example of an interface image produced by the image interface control section 215. The radar image R is, for example, displayed in semi-transparent green at the upper right of a display screen for allowing the player to see a relative position 311 and a field of vision 312 of a player character and relative positions 313 and a field of vision 314 of counterpart characters. The positions 313 and the field of vision 314 of the counterpart characters are changed at random. When the player character gets in the field of vision 313 of the counterpart character, the color of the radar image R is changed stepwise, for example, from red to yellow according to the degree of danger, and further, a variation of the danger degree, a remaining time of that color and so on are displayed in the radar image R. If the remaining time is displayed, the player needs to operate the controller 52 so as to take a necessary measure within the displayed time.

Figure 4:
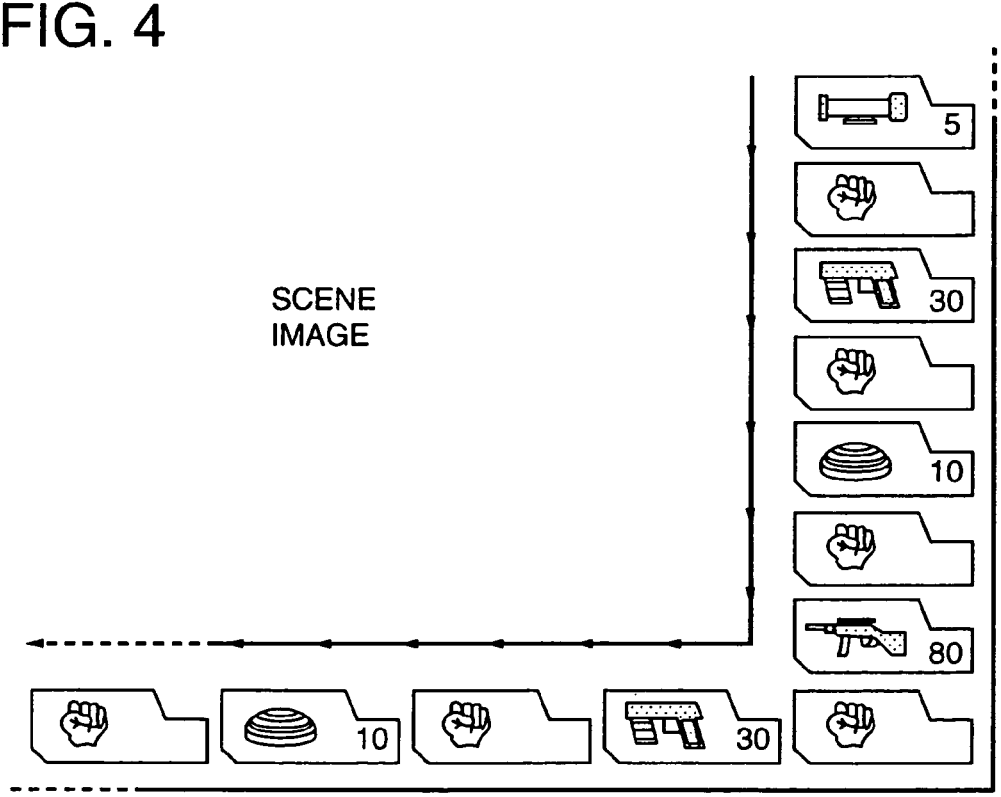
FIG. 4 is an explanatory diagram showing an interface image for item selection which is displayed when shifted to a fighting scene.

In this embodiment, the image interface control section 215 produces an interface image for item selection when shifted to a fighting scene. The shift to the fighting scene occurs when a fight with a counterpart character becomes possible. The interface image for the item selection is, for example, as shown in FIG. 4, wherein empty hand items and weapon items are arranged in a beltlike fashion. The player can select one of the items using the controller 52 and use it. The items are displayed so as to be scrolled in sequence. This can save the item display region. As shown in FIG. 4, the weapon items are arranged at both sides of each empty hand item so as to allow the player to select an adequate weapon in a shorter time.

Now, the foregoing mode processes executed at the image managing section 213 will be described in more detail.

(1) Bird's Eye View Mode Process

In the bird's eye view mode process, data is produced for displaying a scene image in which the player character and the state of motion thereof are watched in a bird's eye view style (air view mode). If the player inputs no command at first, this process is carried out.

In the bird's eye view mode, the viewpoint position is located at the upper rear of the player. In this state, the player can input commands for moving the player character in the longitudinal and transverse directions by operating the key or joystick of the controller 52. Based on the inputted commands, the image managing section 213 moves the player character in the longitudinal and transverse directions (vertical and transverse directions on the screen).

(2) Subjective Mode Process

In the subjective mode process, data is produced for displaying an image subjectively viewed by the player character's viewpoint (subjective mode), and the tone generator managing section 217 is commanded to control the sound control section 30 to produce sound effects, voices and sounds of magnitudes corresponding to circumstances. For example, when a counterpart character is located far away or when a sound is generated far away, a voice or sound is set to be small, then, as it approaches, a voice or sound is set to be larger.

This process is carried out only while the player operates a particular key or a joystick of the controller 52 when the player character is stopped in the state where the player character can freely move in the longitudinal and transverse directions.

Figure 5:
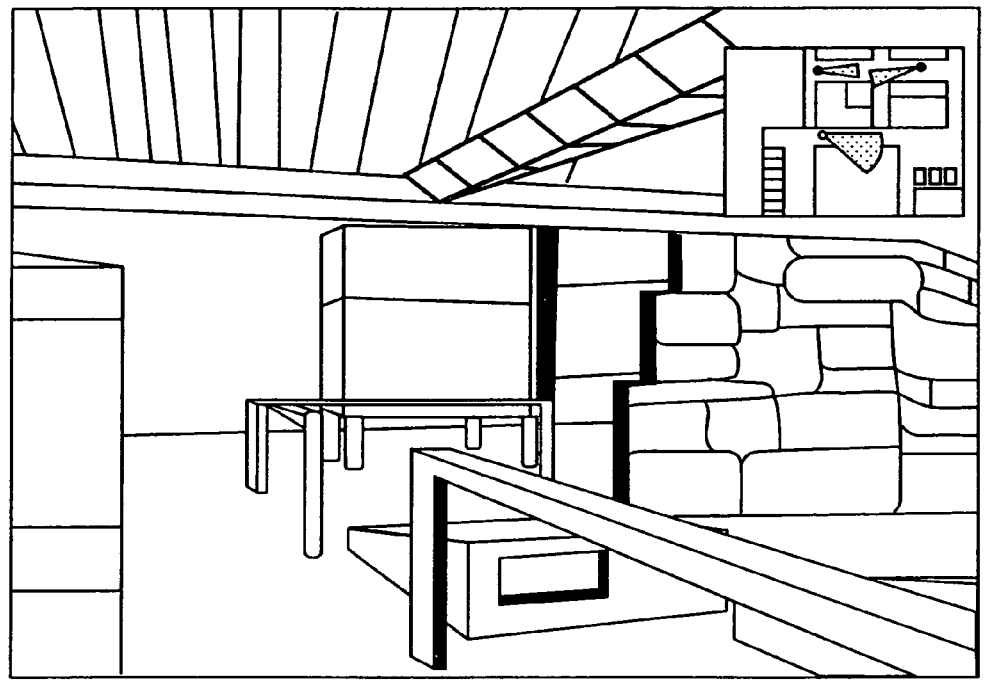
FIG. 5 is a diagram showing an image display example according to a first person view mode process.

The viewpoint position and the viewing direction in the subjective mode substantially coincide with those of the player character. In the subjective mode, commands for moving the player character in the longitudinal and transverse directions can not be inputted, but instead, when the player operates a key or joystick of the controller 52, the viewing direction changes correspondingly. FIG. 5 shows a scene image when the subjective mode is executed, which corresponds to the visual field 312 (see FIG. 3) of the player character.

(3) Intrude Mode Process

In the intrude mode process, data is produced for displaying a scene image viewed by the player character's viewpoint in the state where the player character is moved (intrude mode), and the tone generator managing section 217 is commanded to control the sound control section 30 like in the subjective mode process.

This process is automatically executed when the player character has moved to a position where the player character can not be seen in the bird's eye view mode, for example, in a duct, in or under an automobile or in a locker.

Figure 6:
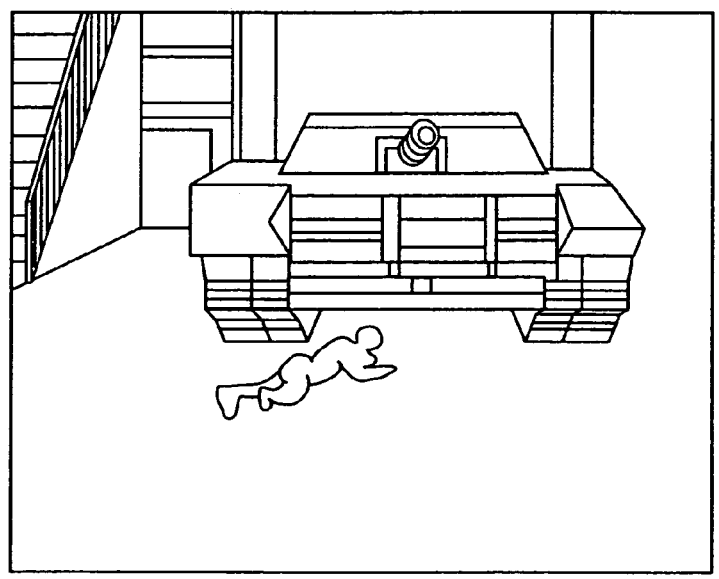
FIG. 6 is a diagram showing the state wherein a player character crawls under a tank in a bird's eye mode.
Figure 7:
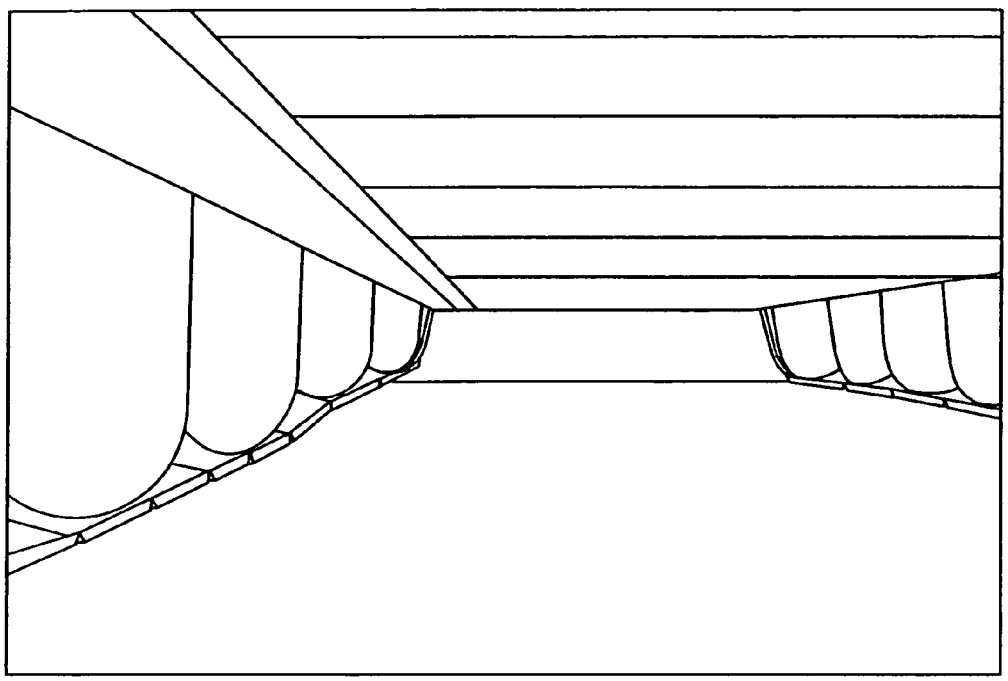
FIG. 7 is a diagram showing an image display example when a bird's eye view mode process is shifted to an intrude mode process in the state of FIG. 6.

For example, FIG. 6 shows the state wherein the player character crawls under a tank in the bird's eye view mode, but after having crawled under the tank, the player character can not be seen hidden behind the tank. In this case, as shown in FIG. 7, switching is automatically carried out to display a scene image viewed by the player character from under the tank. This process can be realized by setting in advance positions of the player character corresponding to the foregoing conditions (moving to the position where the player character can not be seen in the bird's eye view mode, and the like).

The intrude mode is the same as the subjective mode in viewpoint position and viewing direction, but differs from the subjective mode in that commands can be inputted for moving the player character in the longitudinal and transverse directions.

(4) Behind Mode Process

In the behind mode process, data is produced for displaying a scene image in which the player character and a region behind a wall are viewed in a single display screen (behind mode), and the tone generator managing section 217 is commanded to control the sound control section 30 like in the subjective mode process. Upon touching against a wall, while moving, a region behind which can not be seen, the player character automatically turns to face the back thereof toward the wall. If the player operates a particular key or a joystick of the controller 52 in this state, the image managing section 213 executes the behind mode process during a period of that operation. This eliminates necessity of getting a face of the player character out of the wall to confirm the region behind the wall. This function is suitable for the role-playing game wherein the player character invades the enemy's territory to achieve some purpose.

Figure 8:
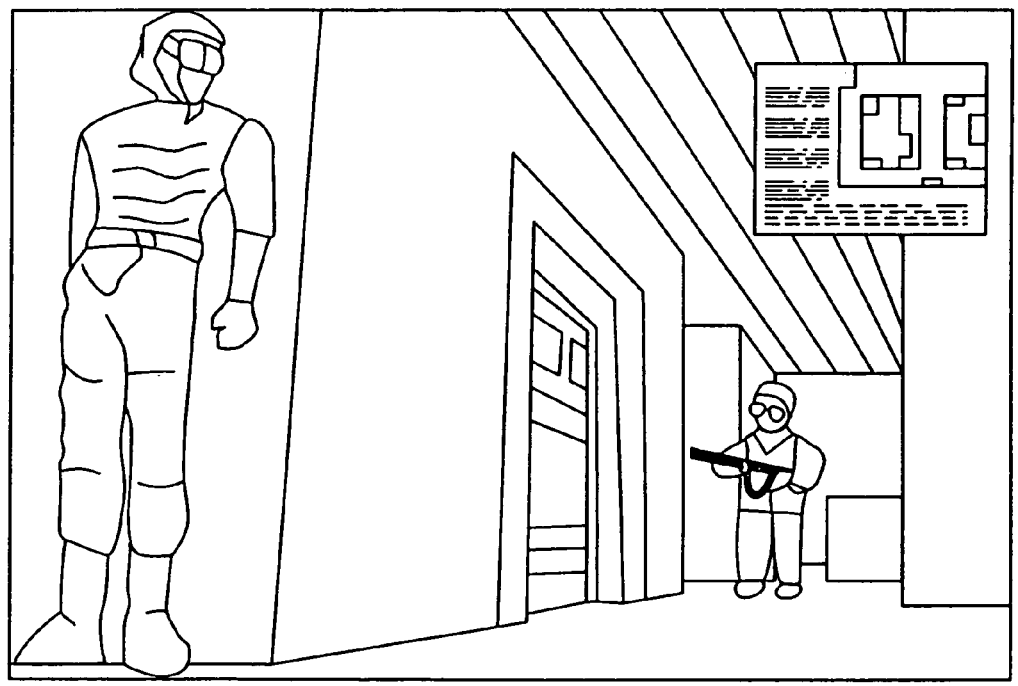
FIG. 8 is a diagram showing an image display example according to a behind mode process.

As shown in FIG. 8, in the behind mode, the viewpoint position is located at the slightly-lower front of the player character, while the viewing direction is a direction which captures the player character in the middle. The player can input commands for moving the player character in the transverse directions (along the wall).

(5) Invasion Mode Process

In the invasion mode process, scene images change according to motion of the player character operated by the player while a radar image is displayed as shown in FIG. 3. In this process, a notification of "during invasion mode process" is given to the tone generator managing section 217 so that the sound control section 30 produces sound effects, background tones and BGM.

(6) Danger Mode Process

Figure 9:
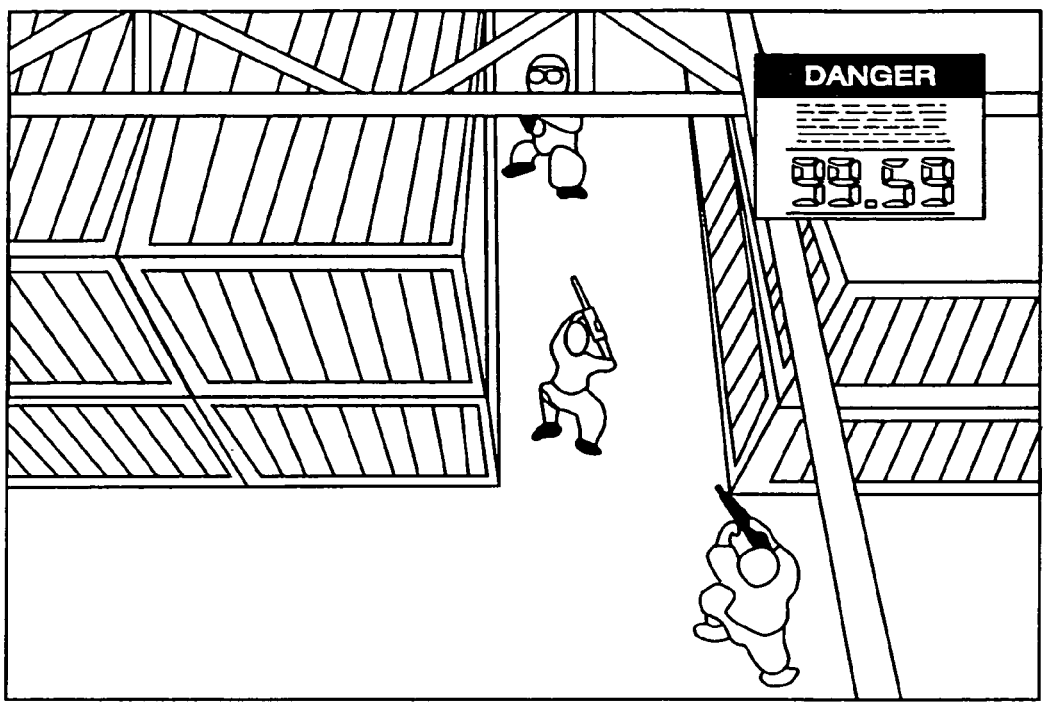
FIG. 9 is a diagram showing an image display example according to an alert mode process.
Figure 10:
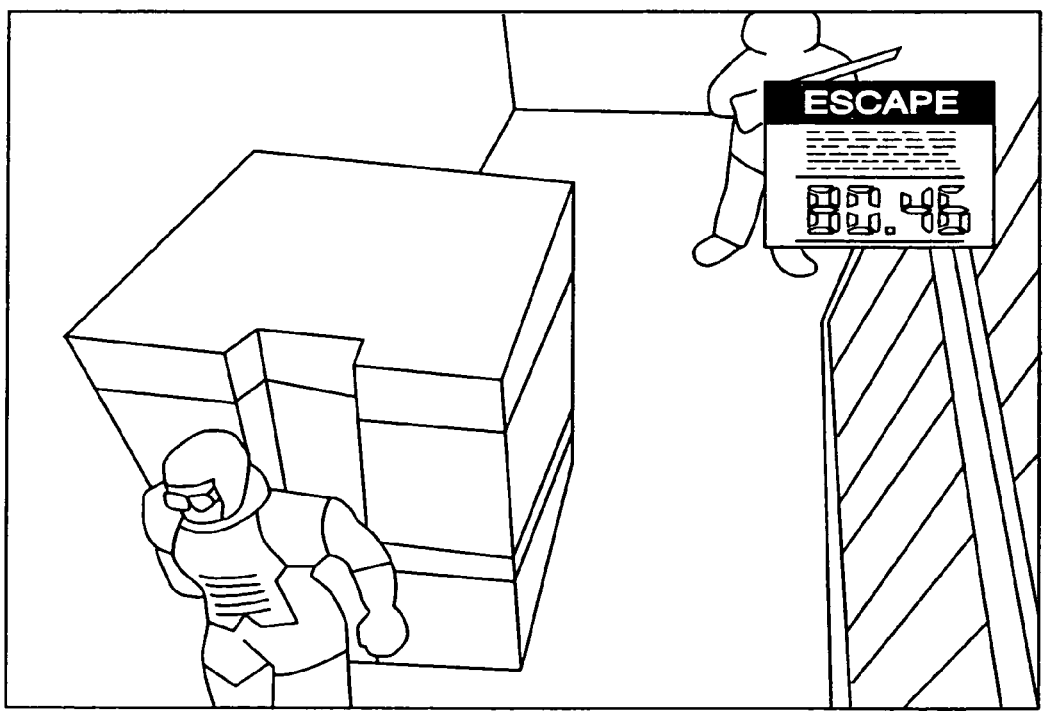
FIG. 10 is a diagram showing an image display example according to an evasion mode process.

Shift to the danger mode process is automatically executed when, for example, the player character has moved into the field of vision of a counterpart character during the invasion mode process or was discovered by a counterpart character not displayed on the display unit 25 during the invasion mode process. In the danger mode process, the sound effects are changed to unique ones representing the state of danger. During the danger mode process, the color of a radar image is changed to red via the image interface control section 215. Further, the degree of danger is quantified according to the state and its variation and a remaining time (time limit) for escaping the danger mode process is calculated, so that the results of quantification and calculation are displayed in the radar image. Moreover, the item selection is allowed using the interface image as shown in FIG. 4 so as to be prepared for fighting. FIG. 9 shows an example of an image displayed by the danger mode process.

(7) Evasion Mode Process

Shift to the evasion mode process is automatically executed when the player character gets out of the field of vision of the counterpart character during the danger mode process, meaning that the player character has escaped the state of danger for the present but is not safe yet. In the evasion mode process, the sound effects are changed to unique ones. During the evasion mode process, the color of a radar image is changed to yellow via the image interface control section 215. Like in the danger mode process, the degree of danger is quantified according to the state and its variation and a remaining time (time limit) for shifting to the invasion mode process is calculated, so that the results of quantification and calculation are displayed in the radar image. When the degree of danger is lowered to no greater than a given value, the evasion mode process is shifted to the invasion mode process.

Now, the image processing method carried out by the foregoing video game apparatus 2 will be described based on a basic mode processing procedure shown in FIG. 11 and an alert/evasion/invasion mode processing procedure shown in FIG. 12. It is assumed that the initial setting upon starting the game has been executed so that the environments for performing the game are in order. Although both processing procedures are mutually related to each other, they will be separately explained for the sake of brevity.

Figure 11:
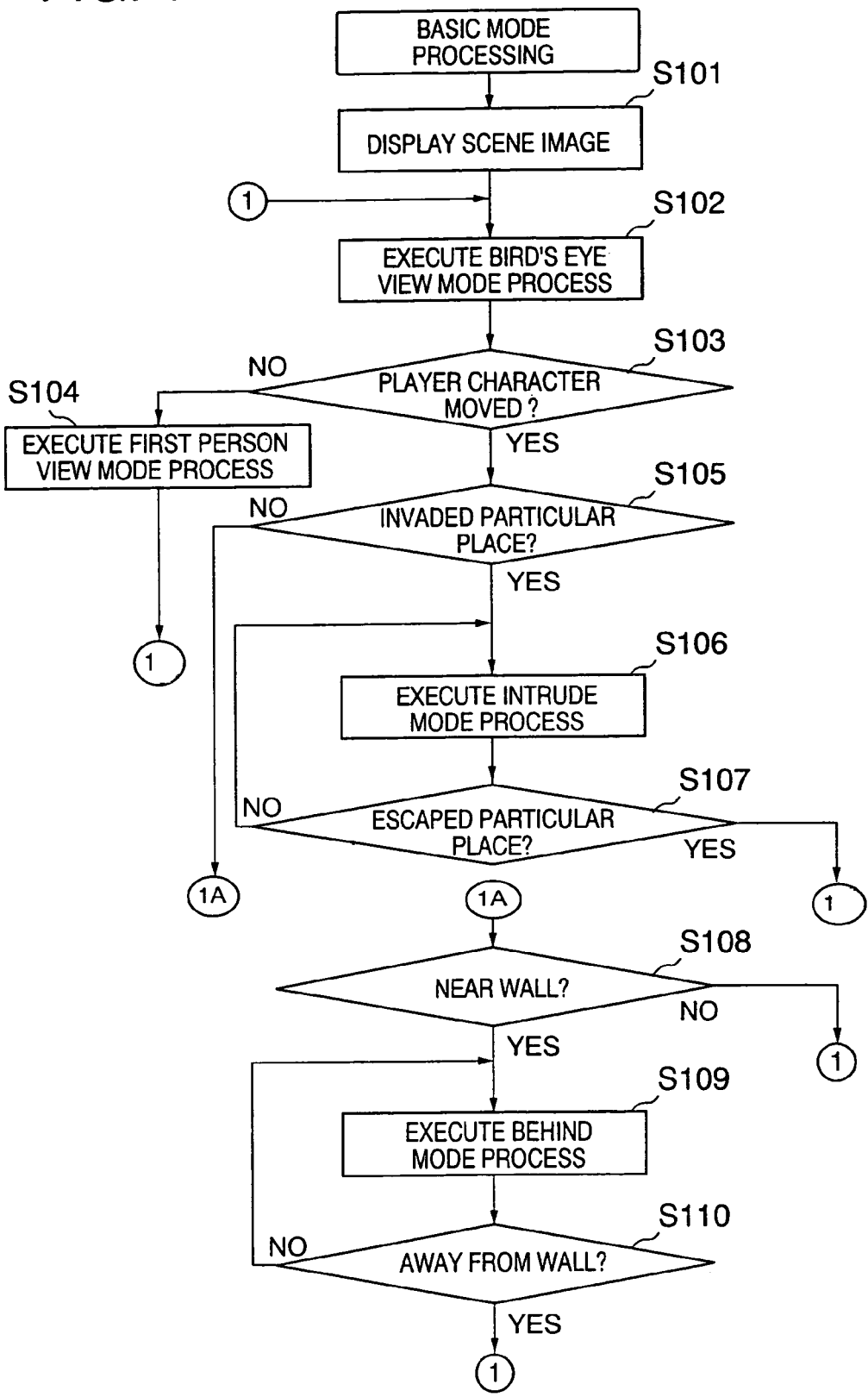
FIG. 11 is a flowchart showing a basic mode processing procedure according to the preferred embodiment of the present invention.

In FIG. 11, as described before, a scene image is displayed according to the bird's eye view mode just after the start of the game and BGM etc. are outputted via the tone generator managing section 217 (steps S101, S102). When the player inputs motion command data, a player character starts moving on the screen of the display unit 25 correspondingly. Simultaneously, a radar image is displayed in semi-transparent green at the upper right of the scene image. The player operates the player character while observing the radar image.

If the player character stops in the movable state (No at step S103), the bird's eye view mode process is shifted to the subjected mode process (step S104). If the player character starts moving during the subjective mode process, the routine returns to step S102 where the bird's eye view mode process is again executed. On the other hand, if the player character has invaded a particular place during the bird's eye view mode process so that the player character can not be seen (Yes at step S103; Yes at step S105), the intrude mode process is executed until the player character escapes that place (steps S106, S107). After having escaped, the routine returns to step S102 where the bird's eye view mode process is again executed.

If the player character has approached a wall or the like a region behind which can not be seen (Yes at step S108), the behind mode process is executed until the player character gets away from the wall or the like (steps S109, S110). The foregoing processes are repeated according to a game scenario.

Figure 12:
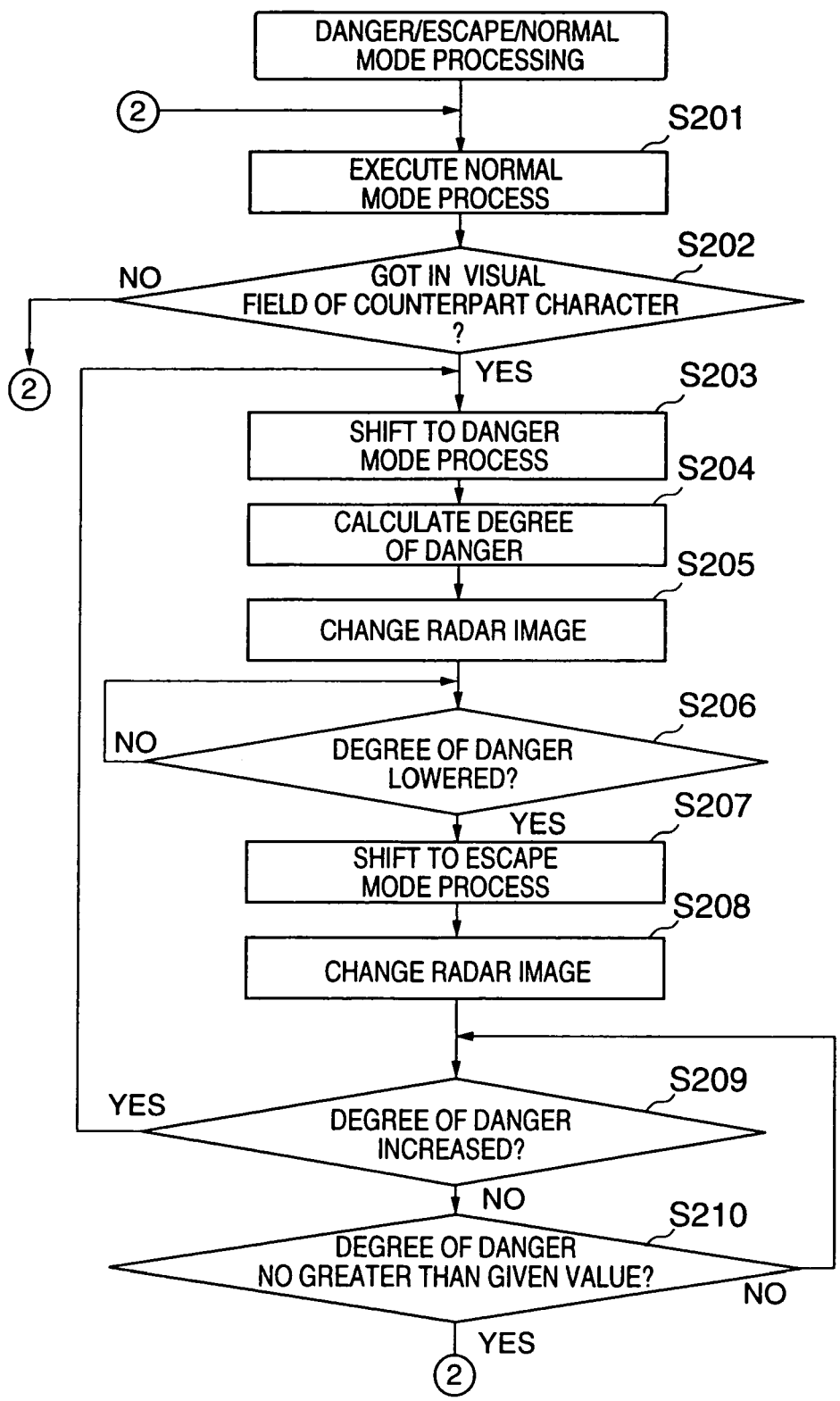
FIG. 12 is a flowchart showing an alert/evasion/invasion mode processing procedure according to the preferred embodiment of the present invention.

In FIG. 12, the invasion mode process is executed just after the start of the game (step S201). If the player character gets in the field of vision of a counterpart character during the invasion mode process (Yes at step S202), the invasion mode process is shifted to the danger mode process (step S203). Specifically, the degree of danger is calculated according to the state (step S204), and the display contents of the radar image are changed (step S205). If the state is changed through the operation by the player so that the degree of danger is lowered, the danger mode process is shifted to the evasion mode process (Yes at step S206; step S207). During the evasion mode process, the radar image is changed to the state unique to the evasion mode process (step S208). If the degree of danger increases during the evasion mode process (Yes at step S209), the routine returns to execute steps S203 to S208. On the other hand, if the degree of danger becomes no greater than a given value (No at step S209; Yes at step S210), the routine returns to step S201 where the invasion mode process is executed. The foregoing processes are repeated according to the game scenario.

While the present invention has been described in terms of the preferred embodiment, the invention is not to be limited thereto, but can be embodied in various ways without departing from the principle of the invention as defined in the appended claims. For example, the present invention is applicable to not only the foregoing fighting type role-playing game, but also other video games which require diversified expressing manners as described above.

What is claimed is:

1. A video game apparatus comprising an image managing section which reads out image element data for a three-dimensional computer graphic image in main memory, produces display data of a character operated by a player and a scene image around the character, and outputs a display command based on the display data, said game apparatus processing a display process according to the display command and displaying said scene image on a predetermined display unit, said video game apparatus further comprising:

a command analyzing section for analyzing command data inputted from a controller;

a player character position/motion detecting section for detecting position and motion of a player character based on the contents of the analyzed command data when the analyzed command data is a command for motion of the character; and said image managing section comprising a mode switching section for selecting one of a bird's eye view mode process, a subjective mode process, and a behind mode process in accordance with the detected position and motion of the player, wherein the bird's eye view mode is selected when the player character is detected to be moving, the subjective mode process is selected when the player character is detected to be stopping while the player character is able to move and the player is operating, and the behind mode process is selected when the player character is positioned at a wall and region where the back of the player character is invisible, wherein when the bird's eye view mode process is selected, said image managing section produces the display data of the scene image for objectively viewing the state of motion for the player character, wherein when the subjective mode process is selected, said image managing section produces the display data of the scene image for subjectively viewed by the player character's viewpoint, and wherein when the behind mode process is selected, said image managing section produces the display data of the scene image for viewing the player character and a region behind the wall.

2. The video game apparatus according to claim 1, wherein said imaging managing section includes a scene image producing section from producing the scene image around the character.

3. The video game apparatus according to claim 2, wherein said mode switching section selects an intrude mode process when the player character is hidden in a predetermined facility in the objectively viewed image scene, and said scene image producing section is constructed to produce data for displaying an image scene subjectively viewed from the player character's viewpoint when the intrude mode process is selected regardless of movement of the player character.

4. The video game apparatus according to claim 1, wherein said mode switching section is constructed to selectively select one of said subjective mode process and said behind mode process based on external command.

5. A video game apparatus comprising:

a controller for operating the motion of a character;

a scene image producing section which produces an image of the character whose motion is operated by said controller and a scene image which changes according to a position and motion of said character and displays said character image and said scene image on a display unit; and a sound effects producing section which produces a sound effect corresponding to the position and motion of said character, and wherein said scene image producing section produces a first scene image when said character is stopped in a movable state and a second scene image when said character is moved, said first scene image subjectively viewed by said character and said second scene image objectively viewing the motion of said character, wherein when said character is hidden by an object in said second scene image, said scene image producing section produces said first scene image regardless of movement of said character, and wherein said sound effects producing section produces the sound effect of a magnitude corresponding to the distance from the source of sound to the character when said first scene image is displayed.

6. The video game apparatus according to claim 5, wherein said scene image producing section comprises an exchangeable memory and a reading section for said memory, and wherein said memory stores image element data for producing said character and said first and second scene images.

7. A computer-readable recording medium storing a game program which causes a computer to execute as an image managing section which reads out image element data for a three-dimensional computer graphic image in main memory, produces display data of a character operated by a player and a scene image around the character, and outputs a display command based on the display data, and to cause the computer to execute to process a display process according to the display command and to display said scene image on a predetermined display unit, said game program further causing to execute said computer as a command analyzing section for analyzing command data inputted from a controller and a player character position/motion detecting section for detecting the position and motion of a player character based on the contents of the analyzed command data when the analyzed command data is a command for motion of the character; and said image managing section comprising a mode switching section for selecting one of a bird's eye view mode process, a subjective mode process, and a behind mode process in accordance with the detected position and motion of the player, wherein the bird's eye view mode is selected when the player character is detected to be moving, the subjective mode process is selected when the player character is detected to be stopping while the player character is able to move and the player is operating, and the behind mode process is selected when the player character is positioned at a wall and region where the back of the player character is invisible, wherein when the bird's eye view mode process is selected, said image managing section produces the display data of the scene image for objectively viewing the state of motion for the player character, wherein when the subjective mode process is selected, said image managing section produces the display data of the scene image for subjectively viewed by the player character's viewpoint, and wherein when the behind mode process is selected, said image managing section produces the display data of the scene image for viewing the player character and a region behind the wall.

8. The computer-readable recording medium according to claim 7, wherein said imaging managing section includes a scene image producing section from producing the scene image around the character.

9. The computer-readable recording medium according to claim 8, wherein said mode switching section selects an intrude mode process when the player character is hidden in a predetermined facility in the objectively viewed image scene, and said scene image producing section produces data for displaying an image scene subjectively viewed from the player character's viewpoint when the intrude mode process is selected regardless of movement of the player character.

10. The computer-readable recording medium according to claim 7, wherein said mode switching section selectively selects one of said subjective mode process and said behind mode process based on external command.

11. A computer-readable recording medium storing a game program which causes a computer having a controller for operating motion of a character to execute as a scene image producing section and a sound effects producing section, said scene image producing section produces an image of the character whose motion is operated by said controller and a scene image which changes according to the position and a motion of said character and displays said character image and said scene image on a display unit, said sound effects producing section produces a sound effect corresponding to the position and motion of said character, and wherein said scene image producing section produces a first scene image when said character is stopped in a movable state and a second scene image when said character is moved, said first scene image subjectively viewed by said character and said second scene image objectively viewing the motion of said character, and wherein when said character is hidden by an object in said second scene image, said scene image producing section produces said first scene image regardless of movement of said character, and wherein said sound effects producing section produces the sound effect of a magnitude corresponding to the distance from the source of sound to the character when said first scene image is displayed.

* * * * *

UNITED STATES PATENT AND TRADEMARK OFFICE
CERTIFICATE OF CORRECTION

PATENT NO. : 7,048,632 B2
APPLICATION NO. : 09/272467
DATED : May 23, 2006
INVENTOR(S) : Hideo Kojima It is certified that error appears in the above-identified patent and that said Letters Patent is hereby corrected as shown below:

On the title page item (57): in the Abstract section, in the first line replace "a" with --an--.

Column 1, Line 17 "," after "by" should be deleted.

Column 1, Line 43 insert --to-- after the word "player".

Column 1, Line 60 "," after "computer" should be deleted.

Column 7, Line 36 insert --in-- after the word "if".

Column 7, Line 37 "," after "scenario" should be deleted.

Column 7, Line 53 replace "control" with --controls--.

Column 12, Line 58 delete "for".

Column 14, Line 16 delete "for".

Signed and Sealed this

Nineteenth Day of September, 2006

JON W. DUDAS
*Director of the United States Patent and Trademark Office*